United States Patent [19]
Owen

[11] 3,787,694
[45] Jan. 22, 1974

[54] FLUIDIC DETECTOR FOR THE DETECTION OF RADIANT ENERGY AND FOR THE ANALYSIS OF GAS MIXTURES

[76] Inventor: Kenneth Owen, 6201 Hibbling Ave., Springfield, Va. 22150

[22] Filed: July 11, 1972

[21] Appl. No.: 270,748

Related U.S. Application Data

[63] Continuation-in-part of Ser. No. 38,005, May 18, 1970, abandoned.

[52] U.S. Cl. .............................. 250/338, 250/343
[51] Int. Cl. ............................................ G01n 21/26
[58] Field of Search .................. 250/43.5 R, 83.3 H

[56] References Cited
UNITED STATES PATENTS

| | | | |
|---|---|---|---|
| 2,555,327 | 6/1951 | Elliott | 250/43.5 R |
| 3,123,295 | 3/1964 | Martin | 250/43.5 R |
| 3,529,152 | 9/1970 | Strange | 250/43.5 R |
| 3,560,736 | 2/1971 | Billetdeaux | 250/43.5 R |

Primary Examiner—Archie R. Borchelt
Assistant Examiner—C. E. Church

[57] ABSTRACT

A radiation detector and gas analyzer of the kind wherein radiant energy is directed along one or more beam-paths into a corresponding number of detector cells containing substances selectively responsive to the radiant energy. Gas is free to flow from one compartment of the detector cell to the other and this flow is used to actuate a sensing element which consists of a variable inductance or capacitance actuated by a vane placed in the path of the gas flow between compartments of the detector cell. The sensing element is made a part of the frequency determining network of an electronic oscillator, and this oscillator is connected with a reference oscillator in phase-lock loop so that when the sensing element moves and causes detuning of the detector oscillator, servo corrective voltages are produced in the phase lock circuit which are proportional to the movement of the sensing element and thus an electrical output is produced which is measured or recorded.

23 Claims, 4 Drawing Figures

FLUIDIC DETECTOR FOR THE DETECTION OF RADIANT ENERGY AND FOR THE ANALYSIS OF GAS MIXTURES

This application is a continuation-in-part of my prior copending application S.N. 38,005 filed May 18, 1970, entitled Fluidic Detector for the Detection of Radiant Energy and for the Analysis of Gas Mixtures and now abandoned.

BACKGROUND OF THE INVENTION

This invention relates to fluid devices for detecting radiant energy and for the analysis of gas mixtures.

Radiant energy detectors and gas analyzers employing the selective frequency absorption character of gases are old in the art and well known. Most such instruments and devices have used a thin metal diaphragm comprising one plate of a capacitor to detect the expansion of gas which takes place when the absorption of radiant energy by the gas causes the temperature of the gas to rise. The change in capacitance resulting from distention of the thin metal diaphragm under the increased pressure of the gas is then detected and amplified to produce an output related to the intensity of the radiant energy field. For example, see Marcel J. E. Golay, U.S. Pat. No. 3,384,749, May 21, 1967, Pneumatic Radiation Detector; M. D. Liston U.S. Pat. No. 2,698,390, Dec. 28, 1954, Apparatus for the Analyzation of Mixtures; and M. D. Liston, U.S. Pat. No. 3,227,873, Jan. 4, 1966, Infrared Detector and Method Utilizing a Gas of Small Molecular Size to be Diffused into the Detector.

All of the examples cited above employ the thin diaphragm method to sense expansion of the gas in the detector cell. An exception is M. A. Elliott, U.S. Pat. No. 2,555,327, June 5, 1951, which suggests a vane suspended in the path of a beam of light and actuated by jets.

An objective of my invention is to provide a new and improved detector cell and one which is easier and less expensive to manufacture and one which will withstand greater mechanical shock and abuse.

It is another object of my invention to reduce the manufacturing and quality control problems to a minimum not heretofore attained, and to provide an instrument non-critical to environment and having long-term stability.

It is another object of this invention to eliminate the extremely delicate and damage-prone diaphragm currently in common use in the detector cells of this type of instrument.

It is another object of this invention to improve the long-term and short-term calibration stability of the electronic circuitry involved in transducing, amplifying and read-out of the detector cell output.

It is another object of this invention to eliminate completely the possibility of maladjustment which in some instruments of this general type produces a negative reading of the output meter or recorder.

It is another object of this invention to utilize high frequency electronic phase detection to obtain very great and highly stable translation of the motions of the sensing element into electronic output.

It is an object of this invention to reduce noise and to improve the signal to noise ratio through the use of electronic circuitry which favors the wanted information and suppresses the unwanted noise signals.

It is an object of this invention to provide a detector which can be designed to operate with chopped radiant energy entering the detector cell or with continuous radiant energy entering the detector cell.

It is an object of this invention to provide electronic circuitry which performs satisfactorily with any detector cell which produces at its output terminals changes in capacity or inductance, separately or simultaneously in any combination.

SUMMARY OF THE INVENTION

The invention relates to a device for determining the presence of a particular gas. The sample containing the gas to be analyzed is subjected to pulses of infrared energy. The gas to be analyzed absorbs the radiant energy within its specific absorption band. The energy which passes the aforesaid sample then passes into a first chamber which may contain nothing other than a gas which is substantially a pure form of the sought-for gas. This latter chamber is connected to a much larger chamber through a small orifice. The larger chamber may contain nothing other than a substantially pure form of the sought-for gas. The pulses of radiant energy passing into the first-named (smaller) chamber cause expansion of the gas therein during the presence of the pulses and contraction of the gas therein during the spacing between pulses, the amplitude of the expansions and contractions being dependent upon the degree of absorption of energy by the sample gas through which the pulses passed before they reached said first chamber. Therefore, there will be a pulse of gas flowing from the first chamber into the second chamber when the gas is expanding in the first chamber and from the second chamber to the first chamber when the gas is contracting in the first chamber. While I have explained that the first and second chambers may be filled with the sought-for gas, it is understood that, if desired, the sought-for gas may be mixed with any other gas (such as inert gases, nitrogen, etc.) which will not interfere with the operation of the device.

Means are provided to indicate the direction and amplitude of the gas flow between said first and second chambers, thereby indicating the analysis of the sample gas.

An improvement feature of this invention, for indicating the amplitude and direction of the pulsating gas flow between said chambers is a vane. Preferably the vane is placed close to a surface having an orifice and suspended so that it can move toward and away from said surface in response to pressure changes between said surface and said vane caused by variations in the rate and direction of the gas flow through the orifice. Thus, when one of the pulses of gas flows through the orifice toward the vane there is a pressure applied to the vane moving it beyond its mean position and away from said surface and when there is a pulse of gas flow through said orifice in a direction away from the vane there is a suction force on the vane tending to move it beyond its mean position and toward said surface.

A further improvement feature of the invention relates to the means for indicating the direction and amplitude and displacment of the vane, this feature comprising in one form an inductor carried by the vane which moves toward and away from a piece of magnetic material as the vane moves back and forth under the influence of the interchange of gas between said chambers. In effect, therefore, there is a variable reactor which in the form shown is a variable inductor.

In a further improvement feature of the invention, the variable reactor may be part of the frequency determining circuit of an oscillator, whereby the frequency determining circuit of the oscillator is varied in accordance with the amplitude and direction of the gas flow between said chambers.

An additional improvement feature of the invention comprises comparing the frequency of said oscillator with an oscillator of fixed frequency, and causing the two oscillators to phase-lock together. A measuring instrument responsive to the outputs of the oscillators, indicates the quantity of the sought-for gas in the sample.

The aforesaid "larger chamber" has one of its inner walls preferably in the form of a flat surface. The aforesaid "small orifice" passes through said wall so that it produces an output jet that emerges from said surface. The aforesaid "vane" is mounted parallel to said surface and has considerably larger surface area than the area of the orifice opening. An important feature of the invention, described in certain of the claims, is that the vane is immediately adjacent the output of the orifice so that the vane is moved almost entirely by the impact on the vane of the gas flowing out of the orifice. Instead of describing this operation in terms of the "impact" of the gas on the vane, it would be proper to refer to it as the molecular impingement of the gas on the vane in a local action which takes place in the region between the aforesaid vane and the aforesaid surface. This action is, therefore, quite distinct from the prior art devices referred to above where a very fragile diaphragm is subject on the one side to the pressure of the chamber as a whole and on the other side to the pressure of some other chamber. With the prior art devices just referred to it is necessary when filling the cell to "drift the gas" to the opposite sides of the diaphragm over long periods of time (in some cases running to more than one day to avoid rupture of the diaphragm); whereas with the present invention no such waiting period is required.

BRIEF DESCRIPTION OF THE DRAWINGS

FIG. 2 is a modified form of the invention, in that it employs parts 135 to 142 not present in FIG. 1 but otherwise discloses the same device as is shown in FIG. 1.

DETAILED DESCRIPTION OF THE APPARATUS

Figure 1:
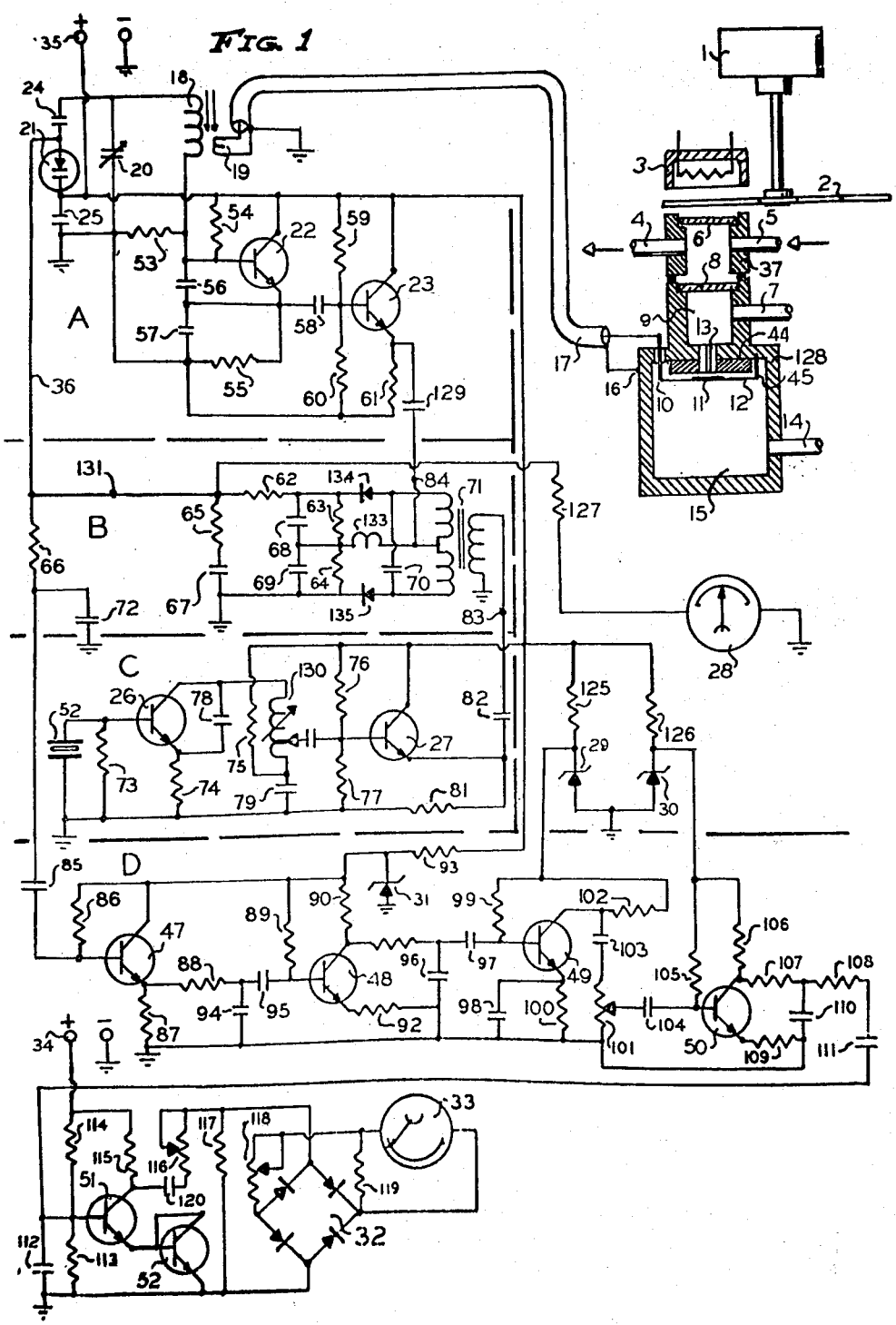
FIG. 1 is a schematic diagram of the invention.
Figure 2:
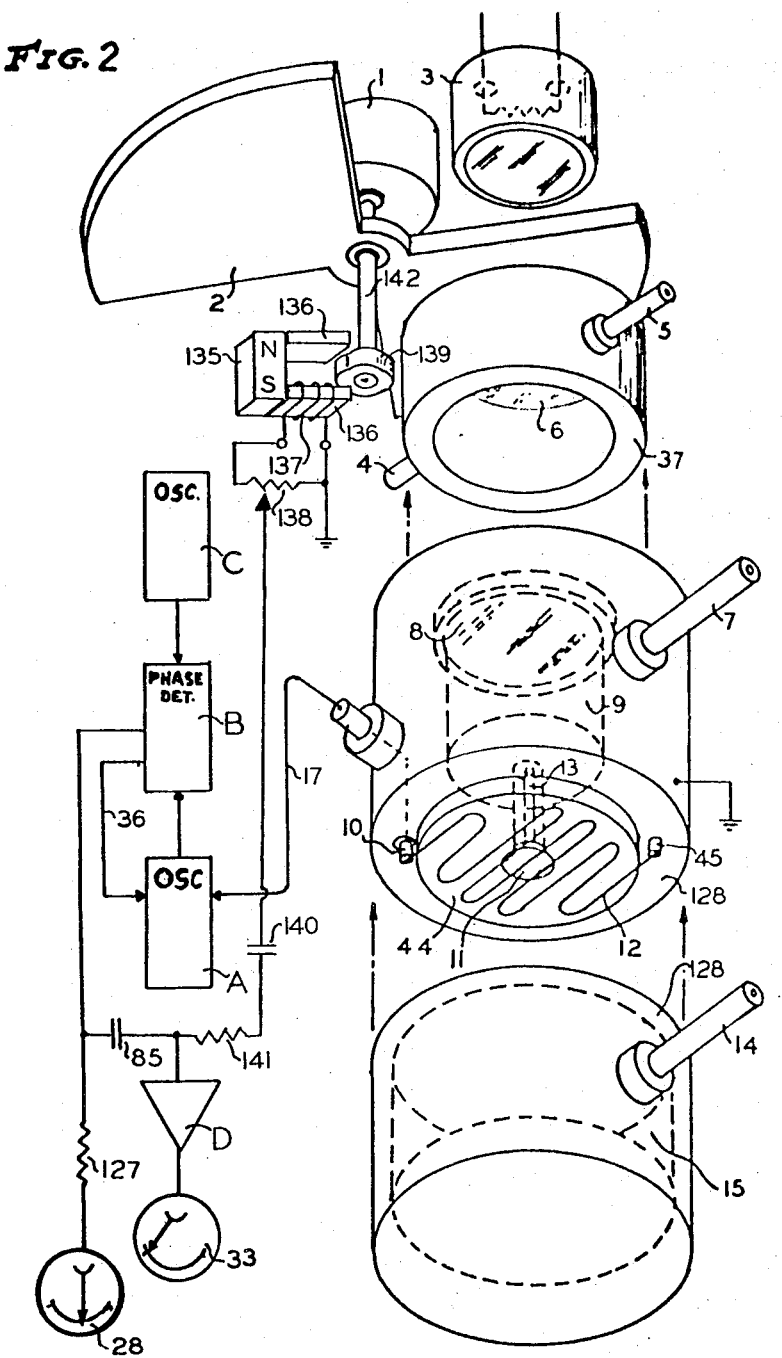
FIG. 2 is an exploded view of the mechanical parts of the invention with the electrical parts in block diagram form.

In FIGS. 1 and 2 there is a source of pulses of infrared energy. This source in one form of the invention comprises a motor 1 driving a chopper 2 at a speed of approximately five revolutions per second. The chopper periodically interrupts infrared energy from heater 3.

When it is desired to determine if a sample contains a particular gas hereinafter called gas $X$, or if it is known that the sample is in doubt, the sample gas may be passed through a chamber 37 by means of input pipe 5 and output pipe 4. The sample gas may be passed continuously through chamber 37, or the chamber filled with the sample gas and then sealed off. Chamber 37 includes an input window 6 for receiving the pulses of infrared energy and an output window 8 through which the infrared energy passes after it has transversed chamber 37. Any energy which passes through window 8 enters chamber 9 of cell 128. This chamber is connected by means of a small orifice 13 to the much larger chamber 15. A quantity of the sought-for gas $X$ in its pure form is injected into chambers 9 and 15 via pipes 7 and 14, as, for example, by passing such gas through those chambers until all other gases have been removed so that the chambers 9 and 15 are full of gas $X$, and no other gas. At this point pipes 7 and 14 are sealed off and the supply of gas $X$ is therefore trapped in the sealed chambers 9 and 15, subject only to interchange of such gas between chambers 9 and 15 via orifice 13.

The amplitude of the radiant energy pulses passing through window 8 into chamber 9 depends upon the existence of and quantity of gas $X$ in the sample present in chamber 37. If chamber 37 does not contain any of gas $X$, then none of the radiant energy passing through that chamber is absorbed and the radiant energy pulses entering chamber 9 cause a large expansion of the gas in such chamber during the presence of the pulses and a large contraction during the spaces between pulses. If, on the other hand, a large quantity of gas $X$ is present in chamber 37, much of the radiant energy of the pulses is absorbed in that chamber, causing a much smaller expansion and contraction of the gas in chamber 9. It is therefore desirable to measure the expansion and contraction of the gas in chamber 9. When the gas in chamber 9 expands, some of it passes through orifice 13 and impinges upon the vane 11 in chamber 15. The vane 11 is supported by an inductor 12 which is made up of flexible wire. The free ends of the inductor 12 are supported by stationary pins 10 and 45, respectively. The vane 11 moves downwardly when the gas in chamber 9 expands and upwardly when the gas in chamber 9 contracts, the amplitude of the movement being dependent upon the amplitude of the expansion and contraction of the gas in chamber 9. The inductor 12 is positioned in proximity to magnetic material 44 which may, for example, be a ferroceramic plate, so that the inductance varies in accordance with the amplitude and direction of the movement of vane 11 which, in turn, varies according to the expansion and contraction of the gas in chamber 9. Inductor 12 is part of the frequency determining circuit 18, 19, 20 of the Colpitts self excited oscillator A.

The oscillator A is a self excited oscillator of the well known Colpitts type in which capacitor 20 and the coil 18 are the main frequency determining elements, capacitors 56 and 57 are the feedback and output loading capacitors respectively, resistor 55 is the output load resistor, and resistors 53 and 54 provide bias for the oscillator transistor 22. An additional part of oscillator A is the tuning diode 21 which serves as a servo receiver to maintain phase-lock of the oscillator A with the output of oscillator C and which is isolated on its control side by capacitor 24 and bypassed to ground on its bias side through capacitor 25.

The oscillator A is an element of a phase-lock system comprised of oscillator A, oscillator C and phase detector B. The oscillator A has in its output circuit an isolation amplifier comprised of transistor 23, load resistor 61, bias resistors 59 and 60 and blocking capacitors 58 and 129.

The oscillator C is shown as a crystal controlled, "tuned plate-tuned grid" type with crystal 52 connected between base and ground of transistor 26. A periodic coil 130 is connected in the collector circuit of transistor 26 and the circuit includes bias resistor 73, emitter resistor 74 and bypass capacitors 78 and 79. Output of the oscillator C is obtained from a tap, as shown, on coil 130. Resistor 75 is a voltage dropping resistor connected in series with the collector supply to transistor 27, load resistor 81, bias resistors 76 and 77 and blocking capacitors 82 and 80.

The phase detector B is a conventional circuit in which the phase of a signal entering at terminal 84 from the oscillator A is compared with the phase of a second signal entering at terminal 83 from the oscillator C, and when the phase of oscillator A tends to lead or lag the phase of oscillator C, a DC potential appears at terminal 131 of the proper polarity such that when this potential is applied to the tuning diode 21, through the connecting wire 36, oscillator A is returned to reduce the phase difference and to maintain phase-lock between the oscillators A and C. As long as a reciprocating gas flow is taking place through the orifice 13, due to the alternate heating and cooling of the gas in the compartment 9 of the detector cell 128, as previously described, the phase of the oscillator A is being influenced alternately to lead and lag the phase of the oscillator C by the tuning effect on the frequency determining circuit of oscillator A which is caused by the reciprocating motion of the sensor sub-assembly consisting of the vane 11 and the wire grid 12. Thus, an alternating voltage is produced at terminal 131, as is required in the closed phase-lock servo loop to keep the phase of oscillator A tracking with the phase of oscillator C and the amplitude of this AC voltage is proportional to the velocity of the reciptrocating gas flow through the connecting orifice 13 between compartments 9 and 15 of the detector cell 128 which is, in turn, proportional to the amplitude of the radiant energy pulses entering the compartment 9 of the detector cell 128. Since the amplitude of the absorption band radiant energy pulses entering compartment 9 is a function of the amount or percentage of sought-for gas contained in the mixture of gases which fill the sample cell 37 at any given moment, the amplitude of the alternating voltage produced at terminal 131, through the process described, is also a function of the percentage of sought-for gas contained in the sample mixture, and this alternating voltage appearing at terminal 131 is amplified through the linear band-pass operational amplifier D to actuate the output meter 33. The output meter 33 is calibrated to read directly in percentage of the sought-for gas which is present in the gas mixture which the sample cell 37 contains at any given time. The meter 28 is a microammeter having zero at the center of its scale and is useful for initial adjustment of the oscillator A to zero phase-lock with the oscillator C and for continuous monitoring of the mean phase-lock condition of the system. Meter 28 should read essentially zero at all times during operation of the system. The value of the multiplier resistor 127 is selected to provide the proper range and sensitivity for the meter 28. The amplifier D is a conventional transistor amplifier having coupling and bypass component values selected to favor amplification at the frequency of the alternating current voltage produced at terminal 131, which is, of course, the frequency at which the chopper blade 2 interrupts the radiant energy from the source 3.

Amplifier D has five stages. The first stage comprises transistor 47, bias resistor 86, load resistor 87, and low-pass output circuit resistor 88, and capacitor 94. The second stage comprises transistor 48, bias resistor 89, load resistor 90, feedback resistor 92 and low-pass output network resistor 91 and capacitor 96. The third stage comprsise transistor 94, blocking capacitor 97, bias resistor 99, high-pass network resistor 100 and capacitor 98, load resistor 102, output blocking capacitor 103 and output gain control resistor 101. The fourth stage comprises transistor 50, blocking capacitor 104, bias resistor 105, load resistor 106, gain stabilizing resistor 109, and low-pass output network resistors 107, 108 and capacitor 110. The fifth stage comprises transistor 51, blocking capacitor 111, bypass capacitor 112, bias resistor 114 and 113, load resistor 115 and gain stabilizer diode 52.

The metering circuit comprises blocking capacitor 120, adjustable series resistor 116, load resistor 117, full wave bridge rectifier 32, meter calibrating resistor 118, meter ballistics control resistor 119, and meter 33.

Chamber 15 is made large compared to chamber 9 to reduce the energy lost in compressing and decompressing the gas in chamber 15 as gas flows in and out of this chamber through orifice 13. Reducing said loss to a minimum in this way gives a large increase in signal-to-noise ratio since the result is to permit greater flow of gas for a given amplitude of pressure changes in chamber 15.

Regulated direct current power supplies are connected to terminals 34 and 35. The zener diodes 31, 29 and 30 with resistors 93, 125 and 126 respectively, regulate the voltage supplied to the first four stages of the audio frequency operational amplifier.

The apparatus of FIG. 1 is identical with that of FIG. 2 if parts 135 to 142 inclusive of FIG. 2 are omitted. When these parts are added, the apparatus may be improved as explained below.

This invention as shown in FIG. 1 gives full scale reading, or maximum calibrated reading, on meter 33 when none of the gas X is present in the chamber 37, and reads less than the calibrated maximum by an amount corresponding to the concentration of gas X present in the gas mixture in chamber 37. Hence, the greater the concentration of gas X being detected, the nearer to zero is the reading obtained, and the readout is said to be negative. FIG. 2 shows the addition of an alternator comprising pole pieces 136, permanent magnet 135, coil 137 and iron armature 139. Armature 139 is mounted on the chopper shaft 142 and has lobes so that when it rotates in the gap between pole pieces 136 the magnetic flux density is caused to vary and to generate an alternating current in coil 137 in exact synchronism with the alternating current produced by the sensing element 12 as translated by the electronic circuit elements A, B and C, as described.

With none of gas X present in the sample chamber 37, the output of the alternator is adjusted to exactly cancel the signal from the sensor at the input to operational amplifier D. Phase cancellation adjustment is made by rotating the assembly composed of pole piece 136, magnet 135 and coil 137 about the axis of armature 139, and amplitude adjustment is made by varying the potentiometer 138. The cancellation signal from the alternator is applied to the input of amplifier D through the blocking capacitor 140 and series resistor 141, producing zero reading on meter 33 when none of gas X is present in sample chamber 37. Since, when any of gas X is present in chamber 37, the output of the sensor is reduced, causing an imbalance in the cancelling signals at the input to amplifier D, an up-scale or positive reading is now obtained corresponding to the concentration of gas X in the gas mixture contained in chamber 37.

The direct current measuring instrument 28 has ballistics too slow to read the usual variations of vane 11 which indirectly result from the chopper alternately permitting and preventing radiant energy pulses to impinge on the gas in cell 9. However, this measuring instrument 28 will indicate both the magnitude and direction of static variations of vane 11 from its normal mean position. Its pointer is at mid-scale when the vane 11 is at its mean position.

It is possible to use the apparatus to indicate the quantity of gas in a sample X without use of the chopper. With the chopper removed, a steady flow of radiant energy will pass through chamber 37 to chamber 9, the amount of such energy being dependent on the quantity of gas X in the sample. If now a supply of gas X is passed into pipe 7 at a predetermined rate, the flow of such gas through orifice 13 will be increased over that entering at 7 in accordance with the heat absorbed by the gas in chamber 9. Thus, the vane 11 will assume a static position indicative of the quantity of gas X in the sample fed into pipe 5, and the measuring instrument 28 will give a static reading indicative of said quantity. In this arrangement pipe 14 would be open.

Figure 3:
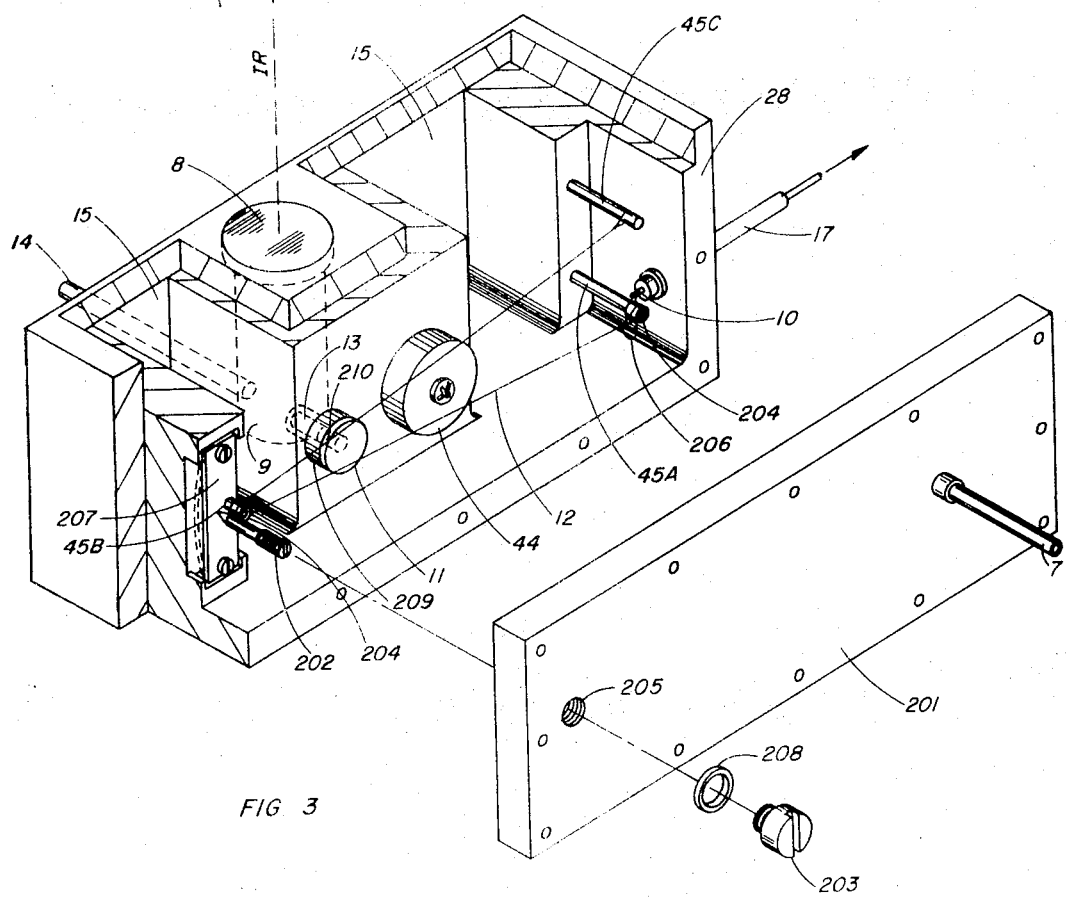
FIG. 3 is a projection of a modified form of the invention. It is a cut away view of the detector cell showing a different means of supporting the wire grid and vane assembly and showing a means of adjusting the spacing between the vane and the surface having the orifice opening.

Referring to FIG. 3, the wire 12 is supported in tension by pins 45A, 45B and 45C and is electrically insulated from ground by insulators 204 at pins 45A and 45B and is connected to the insulated feed-through 10 at the end supported by pin 45A, and is connected to ground on the detector cell 28 wall by pin 45C. The wire 12 passes close to and in front of ferromagnetic plate 44. The inductance of wire 12 is thereby a function of the spacing between the wire 12 and ferromagnetic plate 44. Thus as vane 11 is moved back and forth by gas flow through orifice 13 the motion of vane 11 is transferred to wire 12 which wire carries vane 11 and the inductance of wire 12 is caused to vary in accordance with the variations in the gas flow through orifice 13 in a manner identical to that described in reference to FIG. 1.

With further reference to FIG. 3, the spacing 210 between vane 11 and the orifice 13, opening through orifice plate 209, is critical to the acceptable performance of this invention. Final setting of this spacing 210 is accomplished by removing adjustment port plug 203 from adjustment port 205 thereby gaining access to sensitivity adjustment screw 202. Adjustment screw 202 which bears on spring plate 207 to which the wire 12 is attached is then set for optimum performance of the sensor, while observing the output of the detector cell. After this adjustment is made, the adjustment port 205 is closed and sealed using adjustment port plug 203 and seal ring 208.

The detector cell construction shown in FIG. 3 has cover plate 201 to seal enclosure 28 thus sealing compartment 15 of the detector cell.

Figure 4:
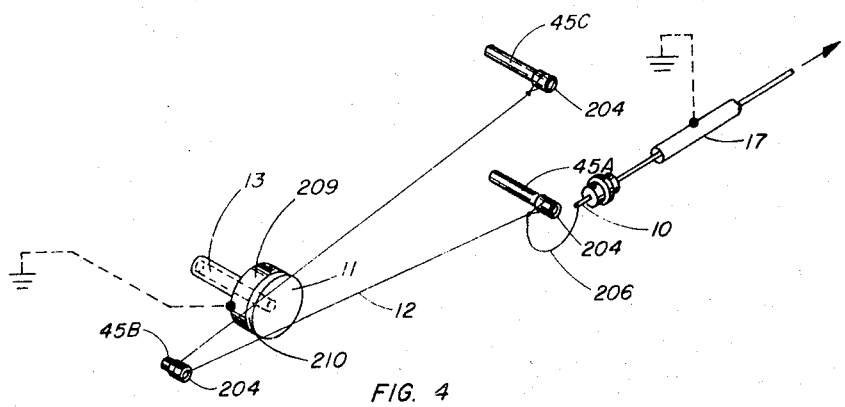
FIG. 4 is a projection of still another modified form of the invention. It is a drawing of the parts of the sensor needed to show the invention when a variable capacitance is the sensing element.

Referring to FIG. 4, a construction of this invention is shown in which variations in gas flow through orifice 13 cause variations in capacitance. In FIG. 4 the wire 12 is insulated from ground over its entire length by insulators 204 and is connected by jumper 206 to insulated feed-through 10 at its end which is supported by pin 45A. In this construction of the invention the vane 11 has a metallic surface, this metallic surface being in permanent electrical contact with wire 12 which provides an electrical connection by way of jumper 204, feedthrough 10 and cable 17 to the electronic circuitry shown in FIG. 1 and described earlier herein. Orifice plate 209 is metallic and is electrically continuous with the detector cell housing 28 to which the outer conductor of cable 17 is also electrically connected. Therefore, orifice plate 209 and vane 11, insulated from each other and connected to the outer and inner conductors respectively of cable 17, become the two plates of a capacitor, the capacitance of which varies in accordance with variations in the position of the vane 11 in response to gas flow through orifice 13 and thus the sensor becomes a varying capacitor rather than a varying inductor.

In each and every form of the invention hereinabove described, as well as shown in FIGS. 1 to 4 and each of them, the spacing between the vane 11 and the output end of the orifice is important. With a vane the surface area of which is 10 or more times the area of the orifice opening, the sensitivity will be good when the spacing between the vane and the surface is less than 0.0004 inch (4.0 ten thousandths of an inch). The sensitivity diminishes to less than 5 percent when the spacing is increased above 0.010 inch. Accordingly the surface of the inner wall of the chamber, through which the orifice passes, is immediately adjacent to the vane. As a result the vane is moved by the impact (molecular impingement) of the gas thereon. Hence, there is a local action involving gas expansion and contraction, occurring in the space between the vane and the surface of the inner wall of the chamber. This differs from the prior art (1) where a very fragile diaphragm is subject to the pressure of the chamber as a whole or (2) the jet is not discharged between two closely spaced walls of large area compared to that of the orifice.

In each of the inventions of FIGS. 1 to 4, as previously described, the vane is mounted in a resilient manner, that is it is biased to a mid-position from which it moves toward and away from the orifice in opposition to such resilient bias and in accordance with the velocity of the gas jet at the orifice.

The vane has an area facing the surface of the chamber wall which is very large compared to the size of the opening in the orifice, for example one hundred times the area of the opening in the orifice.

It is noted that in the claims, I use the term "immediately adjacent" to describe the proximity of the vane to the surface of the wall containing said orifice. This term is intended to describe the close relationship between said vane and said surface as explained above.

I use the word vane broadly, since within the broader aspects of the invention its shape and mounting is not the primary consideration. While it is preferable to mount the vane in one of the specific ways that I have shown, the vane in fact could be a resilient diaphragm fixedly secured at it periphery, provided the gas can escape around or through the diaphragm into the part of the chamber that is on the side of the diaphragm opposite the orifice.

The vane 11 could, of course, be mounted immediately adjacent either end of the orifice 13, that is in either of chambers 9 or 15 (FIG. 1). Indeed, the orifice 13 could be made larger and vane 11 could be mounted within the orifice itself, provided that there was some space between the outer periphery of the vane and the orifice wall around the vane. Even in this latter case, the orifice can properly be described as "restricted;" because while the orifice in the absence of the vane might well be too large to be called "restricted" nevertheless the large vane would restrict the area of gas flow through the orifice thus creating a "restricted" orifice. The arrangement described in the two immediately preceding sentences is not nearly as effective as the arrangements described earlier but is within the scope of some of the broader claims.

I claim to have invented:

1. Measuring apparatus comprising first and second chambers connected by an orifice that is small compared to the cross-section of either chamber, the first chamber having small volume as compared to the volume of the second chamber and also having an input window for receiving radiant energy, one of said chambers having an internal wall with a surface area generally transverse to the direction of flow out of said orifice which surface area is more than ten times, and therefore large compared to, the cross-sectional area of said orifice, and means for indicating the gas flow through said orifice comprising a vane of large area as compared to that of the cross-sectional area of the orifice and no more than 0.01 inch from the end of the orifice which feeds said one chamber to thereby form a very limited gas volume between the vane and said large surface of the inner wall of said chamber whereby to create a pressure on the vane to move it in one direction beyond its mean position when gas flows toward the vane and to create a vacuum at the vane to move it in the opposite direction beyond its mean position when gas flows into the orifice away from the vane.

2. Measuring apparatus as defined in claim 1 in which said vane is located in the second chamber, the volume of the second chamber being large as compared to the volume between the vane and that inner wall of the second chamber which is adjacent the outlet end of the orifice, and said vane being mounted so that gas may flow across at least part of its periphery from the area adjacent the outlet of the orifice to the portion of the chamber volume that is on the side of the vane opposite the side that faces the orifice to thus enable rapid dissipations of pressure changes adjacent the orifice outlet into the chamber as a whole.

3. A device for measuring the intensity of pulses of radiant energy comprising a first chamber in the path of said radiant energy and containing a gas, said chamber having a radiant-energy permeable portion permitting said radiant energy to enter, a second chamber containing a gas, a restricted orifice between said chambers for developing a jet the velocity of which varies in relation to the intensity of said pulses of radiant energy, and jet responsive vane means the position of which is independent of the static pressure in either chamber and responsive to impact of gas flowing between said chambers to effect movement of such jet responsive vane means in relation to the force resulting from such impact, means for closely coupling the jet responsive vane means to the gas flow through said orifice including mounting means positioning said jet responsive vane means so that gas flowing through said orifice from the first to the second chamber applies a pressure against a first face of said vane means to move the vane means beyond its mean position in a first direction and responsive to the flow of gas from the second to the first chamber to create a vacuum at said first face to suck the vane means beyond its mean position in a second direction which is opposite to the first one whereby in response to pulses of radiant energy entering the first chamber the vane means is moved beyond its mean position in both said first and second directions, said close coupling being characterized by a portion of the chamber wall extending away from the periphery of the orifice and being at least ten times the cross-section of the orifice and not greater than 0.01 inch from the vane means, and indicating means responsive to movement of said jet responsive means.

4. A device for measuring the intensity of pulses as defined in claim 3 in which said indicating means includes an electrical circuit the inductance of which is varied according to variations in the position of said jet responsive means.

5. A device for measuring the intensity of pulses as defined in claim 3 in which said indicating means includes an electrical circuit the capacitance of which is varied according to variations in the position of said jet responsive means.

6. A device for measuring the intensity of pulses of radiant energy as defined in claim 3 in which said jet responsive means is mounted immediately adjacent one end of said orifice.

7. A device for measuring the intensity of pulses of radiant energy as defined in claim 6 in which the jet responsive means has a large surface area transverse to direction of gas flow from the orifice.

8. A device for measuring the intensity of pulses of radiant energy as defined in claim 7 in which the large surface area of the jet responsive means is generally parallel to a large surface area of a chamber wall, with one end of said orifice terminating at one end at said last named surface.

9. A device for measuring the intensity of pulses of radiant energy as defined in claim 8 in which said end of said orifice directs the gas flow at or near the middle of the large surface of the jet responsive means.

10. A device for measuring the intensity of pulses as defined in claim 3 in which said indicating means includes an electrical circuit the impedance of which is varied according to variations in the position of said jet responsive means.

11. A device for measuring the intensity of pulses of radiant energy as defined in claim 3 in which the jet responsive means is a vane which is resiliently biased to a mid-position from which it moves back and forth toward or away from an end of said orifice in response to pulses of gas flow.

12. A device for measuring the intensity of pulses of radiant energy as defined in claim 11, in which the vane is mounted on at least one elongated resilient element which per-mits the vane to move back and forth in response to the impact of pulses of gas flow.

13. A device for measuring the intensity of pulses of radiant energy as defined in claim 12 in which said elongated resilient element is a wire.

14. A device for measuring the intensity of pulses of radiant energy as defined in claim 12 in which said elongated resilient element is metallic and is part of an electrical cir-cuit the impedance of which varies when the position of said element varies.

15. A device for measuring the intensity of pulses of radiant energy as defined in claim 14, having magnetic material adjacent said elongated resilient element so that the inductance of the circuit varies when said element moves with respect to the position of said material.

16. A device for measuring the intensity of pulses of radiant energy as defined in claim 14, in which said elongated resilient element is one plate of an electrical capacitor, the circuit including another plate of the capacitor adjacent the first one so that as the vane moves back and forth the plates move toward and away from each other.

17. A device for measuring the intensity of pulses of radiant energy comprising a first chamber in the path of and permeated by said radiant energy and containing a gas, a second chamber containing a gas, an orifice connecting said chambers, gas flow sensing means comprising two walls spaced apart no more than 0.01 inch over an area at least 10 times greater than the area of the orifice, the first of said walls comprising the wall through which the said orifice enters said second chamber and the second of said walls comprising a vane, mounting means for said vane to permit its motion in response to pressure changes in the said space between said walls as gas enters and leaves through said orifice in response to pulses of radiant energy in said first chamber, and means for indicating the movements of the vane.

18. A device for measuring the intensity of radiant energy as defined in claim 17 in which said first-named area is on the order of 100 times the cross-sectional area of the orifice.

19. A device as defined in claim 18 in which said walls are spaced apart a distance on the order of 0.0004 inches.

20. A device for measuring the intensity of pulses of radiant energy comprising a first chamber in the path of said radiant energy and containing a gas, said chamber including a portion permeable by said radiant energy, a second chamber containing a gas, a restricted orifice connecting said chambers, one of said chambers having a wall through which said orifice enters the chamber and which wall has a surface area extending away from the orifice outlet which is more than ten times, and therefore large compared to, the cross-sectional area of the orifice, vane means also of large area compared to the cross-sectional area of the orifice and mounted for movement back and forth about a mean position and facing said large surface area of the chamber and immediately adjacent thereto, being within 0.01 inch thereof, and effecting movement beyond the mean position in a first direction when pressure is applied to the side of the vane facing the orifice by the gas flow through the orifice in a direction toward the vane means and effecting movement beyond the mean position in a second direction when a suction force is applied to the side of the vane facing the orifice by the gas flow through the orifice in a direction away from the vane means, and indicating means responsive to movements of the vane means.

21. Measuring apparatus as defined in claim 20 in which the vane is mounted to provide a gas passage around most of its periphery so that the pressure or vacuum pulses built up between the vane and that part of the chamber wall that is around the orifice outlet may rapidly dissipate around the periphery of the vane into the chamber in which the vane is located.

22. Measuring apparatus as defined in claim 21 in which the volume of gas between the vane and that part of the chamber wall which is adjacent to the outlet end of the orifice is small as compared to the volume of the chamber in which the vane is located.

23. A device for measuring the intensity of pulses of radiant energy comprising,
 a chamber in the path of said radiant energy and containing a gas,
 variable reactor means responsive to expansion and contraction of said gas due to the radiant energy of said pulses,
 first oscillator means including said variable reactor in its frequency determining circuit,
 second oscillator means,
 means for phase-locking the first oscillator means to the second oscillator means,
 and means for indicating phase differences between the first oscillator means and the second oscillator means as a measure of said intensity.

* * * * *